LE LARON C. COLT.
DIE FOR CUTTING OUT PARTS OF SHOE UPPERS.
APPLICATION FILED NOV. 3, 1909.

999,962.

Patented Aug. 8, 1911.

WITNESSES.
C. G. Bradley.
J. H. Thurston

INVENTOR.
Le Laron C. Colt,
By Wilmarth H. Thurston
ATTORNEY.

UNITED STATES PATENT OFFICE.

LE BARON C. COLT, OF BRISTOL, RHODE ISLAND.

DIE FOR CUTTING OUT PARTS OF SHOE-UPPERS.

999,962.

Specification of Letters Patent.

Patented Aug. 8, 1911.

Application filed November 3, 1909. Serial No. 525,988.

*To all whom it may concern:*

Be it known that I, LE BARON C. COLT, of Bristol, in the county of Bristol and State of Rhode Island, have invented certain new and useful Improvements in Dies for Cutting Out Parts of Shoe-Uppers; and I do hereby declare the following specification, taken in connection with the accompanying drawings, forming a part of the same, to be a full, clear, and exact description thereof.

The present invention relates to a die for cutting out the parts which go to make up the upper of a shoe, the die shown in the accompanying drawings being especially designed and adapted for cutting out the parts composing the upper of a tennis-shoe. The upper of such a shoe is composed of four parts, viz., a top, two gussets and a tongue.

Heretofore the several parts referred to have ordinarily each been cut by a separate die, although as the two gussets are counterparts of each other, both of said gussets might be cut by the same die successively, and so that although the cutting of the four parts might thus be effected by the use of three separate dies, four successive cutting operations were necessary, one for each of the four parts of the upper.

Recently a die has been devised by means of which one of the gussets could be cut simultaneously with the top, thereby reducing the number of cutting operations required from four to three, and by means of which die a certain saving of material was also effected. The die referred to forms the subject of an application of even date herewith.

The object of the present invention is to still further reduce the number of cutting operations required in cutting out the four parts of the upper, and also to still further reduce the percentage of waste of the material from which the parts are cut.

To that end the invention consists in a novel die constructed and adapted to simultaneously cut out all four parts of the upper, viz., the top, the two gussets, and the tongue, and whereby the number of cutting operations required in cutting out the four parts of the upper is reduced to one, all four parts being simultaneously cut out by one and the same die. Moreover with said die both the two gussets and the tongue are cut from what would otherwise be waste material.

Figure 1:
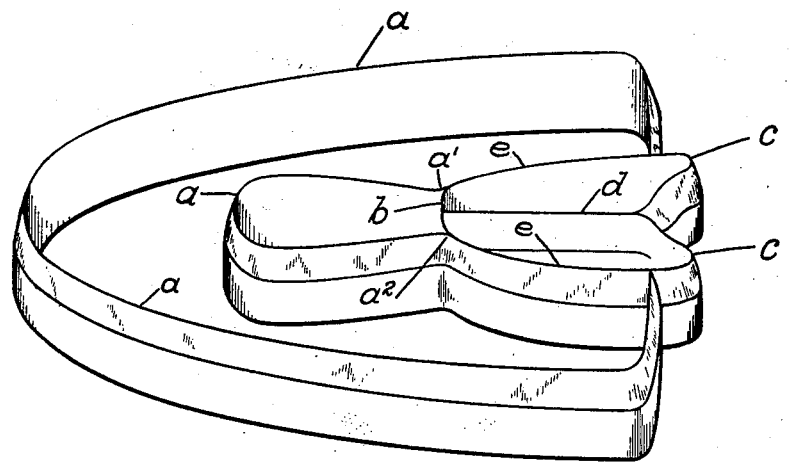
Figure 3:
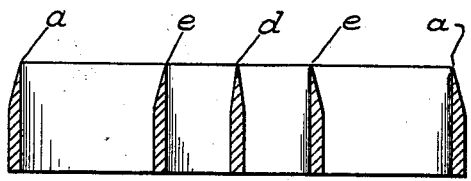
Figure 2:
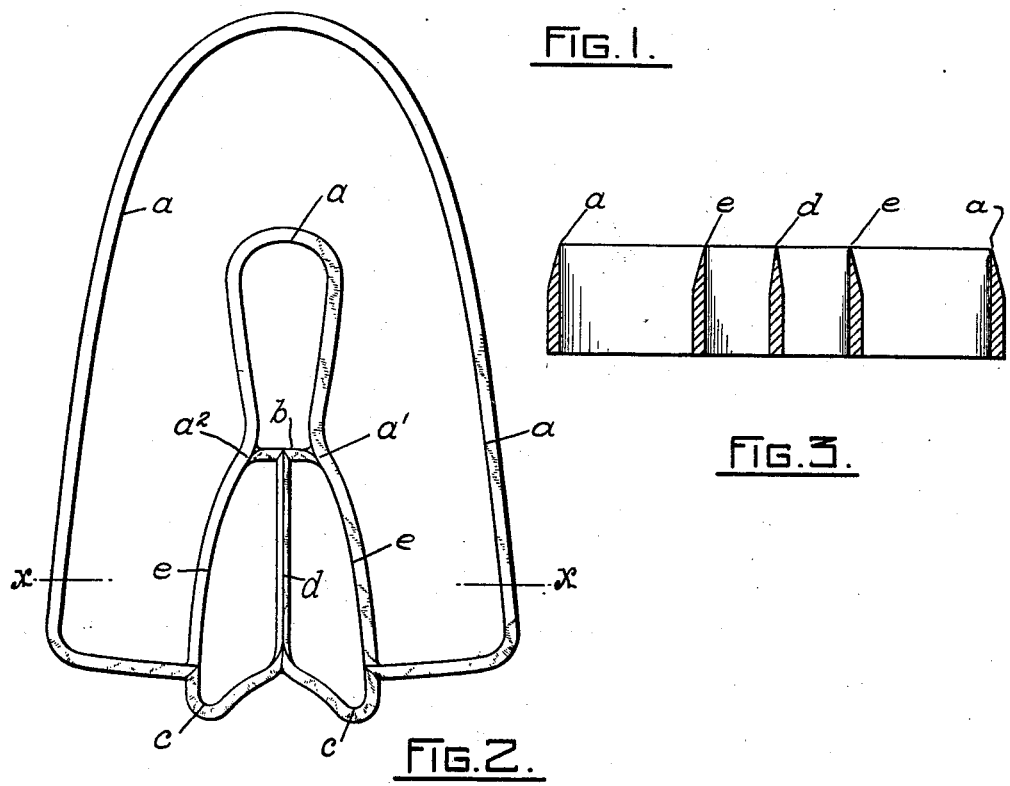

Referring to the drawings, Figure 1 is a perspective view of my new die, with the cutting edges uppermost. Fig. 2 is a plan view of the same, and Fig. 3 is a transverse section on the line $x-x$ of Fig. 2.

A represents the die as a whole. The main portion of said die is provided with a cutting edge $a$ and is constructed and adapted to cut a top of approximately the form or shape which was cut by the top die heretofore employed. I have discovered, however, that by modifying somewhat the shape of the top and of the tongue, both the two gussets and the tongue may be cut from what, when the old top-cutting die was employed, was waste material, and so that not only the top itself, but also the two gussets and the tongue, may be cut from the sheet of material substantially within the compass of the top, while at the same time all four of the parts may be simultaneously cut with one and the same die. Thus referring to Figs. 1 and 2, it will be seen that that portion of the cutting edge of the die which extends from the point $a'$ forward and around to the point $a^2$ is of a proper shape to form a tongue, and that by providing a transverse cutting edge $b$ extending from the point $a'$ to the point $a^2$, a tongue will be cut by the cutting edges referred to. So also by providing the supplemental cutting edges $c$ $c$ and the longitudinally cutting edge $d$ two gussets of proper shape will be cut by the cutting edges last referred to, in connection with the transverse cutting edge $b$ and the portions $e$ $e$ of the main cutting edge $a$. As will be seen, each cutting edge $e$ is common both to the top cutting portion of the die and to a portion which cuts one of the gussets.

With my new die, as will be seen, all the four parts which compose an upper, viz., the top, the two gussets, and the tongue, will be simultaneously cut with one and the same die and at a single cutting operation, thereby reducing the time and expense involved in cutting out such parts. It will be further seen that the two gussets and the tongue are cut from what would otherwise be waste material, and that the four parts of the upper, including the two gussets and the tongue, are all cut substantially within the compass of the top, and so that in the cutting of such parts, there is no waste, all of the material lying within the compass of the die being utilized and going to form the four parts of the upper and without even any marginal waste between the several parts.

It is to be further noted that the saving of material effected is a double saving. Thus not only are the two gussets and the tongue cut from what would otherwise be waste material and without any marginal waste, but there is the further saving of the clear stock from which said gussets and tongue would otherwise have to be cut, with the accompanying marginal waste incident to the cutting of such gussets and tongue from clear stock. Thus with my new die there is not only a large saving in the time and expense involved in cutting out the parts of an upper, but there is also a very great saving of material, the amount of waste being reduced to a minimum. Moreover, it has been found that the change in the form of the top to enable the gussets and the tongue to be cut within the compass of the top, as above set forth, results in an improvement in the finished shoe and in the production of a shoe which is more comfortable for the wearer.

What I claim as my invention and desire to secure by Letters Patent is:

A die for cutting out the parts of a shoe-upper consisting of a cutter having the outline of the top, and tongue and gusset dies said parts being of dissimilar shape lying substantially within the compass of, but external to, the top die and formed partly of the same, partly of attached supplemental cutting edges, as set forth.

LE BARON C. COLT.

Witnesses:
W. H. THURSTON,
J. H. THURSTON.

---

Copies of this patent may be obtained for five cents each, by addressing the "Commissioner of Patents, Washington, D. C."